US007455167B2

(12) United States Patent  
Ludwig et al.

(10) Patent No.: US 7,455,167 B2
(45) Date of Patent: Nov. 25, 2008

(54) HOLDING DEVICE

(75) Inventors: Peter Ludwig, Tuebingen (DE); Bernd Waser, Marbach (DE); Erwin Olescher, Sachsenheim (DE); Jens Koch, Hannover (DE); Rudolf Moeller, Gehrden (DE)

(73) Assignee: Bosch Rexroth AG, Stuttgart (DE)

( * ) Notice: Subject to any disclaimer, the term of this patent is extended or adjusted under 35 U.S.C. 154(b) by 576 days.

(21) Appl. No.: 11/180,073

(22) Filed: Jul. 13, 2005

(65) Prior Publication Data

US 2006/0104752 A1 May 18, 2006

(30) Foreign Application Priority Data

Jul. 30, 2004 (DE) .................. 10 2004 037 004

(51) Int. Cl.
*B65G 15/64* (2006.01)
*B23Q 7/00* (2006.01)
(52) U.S. Cl. .................................. 198/345.2
(58) Field of Classification Search .......... 198/345.1, 198/345.2, 345.3, 621.1, 750.11, 750.3, 750.5; 408/70; 483/15; 33/568; 318/35, 39
See application file for complete search history.

(56) References Cited

U.S. PATENT DOCUMENTS 4,589,540 A * 5/1986 Kampf ................. 198/346.2
5,002,175 A * 3/1991 Drexel et al. ............. 198/345.3
6,131,721 A * 10/2000 Arakawa et al. .......... 198/468.3
6,211,591 B1 * 4/2001 Kowalski et al. ............. 310/80
6,272,763 B1 * 8/2001 Yamaguchi et al. ........... 33/568
6,749,057 B2 * 6/2004 Kato ....................... 198/750.7
6,761,526 B2 * 7/2004 Lee ............................ 414/618
6,860,380 B2 * 3/2005 Watanabe et al. ...... 198/750.11
7,189,049 B1 * 3/2007 Blomgren et al. ......... 414/751.1
7,331,093 B2 * 2/2008 Ferrari ....................... 29/38 B

FOREIGN PATENT DOCUMENTS

| DE | 3710043 | 10/1988 |
| DE | 3806436 | 9/1989 |
| EP | 0 036 955 A2 | 10/1981 |
| EP | 0036955 | 10/1981 |

* cited by examiner

Primary Examiner—Douglas A Hess
(74) Attorney, Agent, or Firm—Michael J. Striker

(57) ABSTRACT

A device (10), which is for holding a transport unit (W) that moves in a transport direction (T), includes an actuator (16) equipped with a drive unit (16c/16d) and an actuating element (16a), which, in an extended position, can be brought directly or indirectly into a holding engagement with the transport unit (W); a sensor unit (22) that is situated before the actuator (16) and a sensor unit (24) that is situated after the actuator (16), both of which are for detecting the presence of a transport unit (W); and a control unit (28) for receiving the detection results of the transport unit sensor units (22, 24) and controlling the actuator (16), wherein the two sensor units (22, 24), the control unit (28), and at least the drive unit (16c/16d) of the actuator (16) are integrated into a shared housing (12).

42 Claims, 5 Drawing Sheets

HOLDING DEVICE

CROSS-REFERENCE TO RELATED APPLICATIONS

This application claims priority under 35 U.S.C. 119, (a)-(d) to German Patent Application DE 10 2004 037 004.4, filed Jul. 30, 2004.

FIELD OF THE INVENTION

The present invention relates to a device for holding a transport unit, which moves along a transport path in a transport direction, comprised of the following components: an actuator equipped with a drive unit and an actuating element, which the drive unit can switch between an extended position and a retracted position and which, in its extended position, can be brought directly or indirectly into a holding engagement with the transport unit, but in its retracted position, allows the transport unit to travel past; a sensor unit that is situated before the actuator in the transport direction and is for detecting the presence of a transport unit before the actuator; a sensor unit that is situated after the actuator in the transport direction and is for detecting the presence of a transport unit after the actuator; and a control unit for receiving the detection results of the transport unit sensor units and controlling the actuator.

BACKGROUND OF THE INVENTION

Holding devices of this kind are used, for example, as separators in production or assembly lines. The transport unit in this instance can be comprised of a work piece holder, a work piece, or the like.

EP 0 036 955 A2 has disclosed a species-defining holding device in which the individual components, in particular the actuator embodied in the form of a pneumatically operating cylinder/piston unit and the two sensor units respectively provided for detecting the presence of a transport unit before or after the actuator, are attached to one another to form a combined unit. In addition, a control unit is provided, which receives the detection results of the sensor units and derives actuation signals for triggering the actuator based on these signals. A particular disadvantage of the known holding device is that the individual components are relatively unprotected from external influences.

SUMMARY OF THE INVENTION

The object of the present invention, therefore, is to modify a device of the above mentioned type so as to better protect its individual components from external influences, for example moisture.

This object is attained according to the present invention by means of a holding device of the species-defining type in which the two transport unit sensor units, the control unit, and at least the drive unit of the actuator are integrated into a shared housing. This integration into a shared housing protects the components of the holding device from external influences, in particular moisture.

In order to minimize the potential penetration of moisture into the housing, the housing is comprised of two parts; a sealing element, preferably a flat seal, can be provided between the two housing parts.

To facilitate assembly of the holding device according to the present invention, the housing can include at least one guide element for one of the components of the holding device. For example, the guide element can include a guide strip formed onto or embodied on the inner wall of the housing.

To facilitate assembly, at least some, but preferably all, of the components of the holding device, including the housing parts, are detent connected, snapped together, or press-fitted to one another in the final assembled state. In particular, this makes it possible to eliminate the time-consuming tightening of assembly screws.

A particularly compact design of the holding device according to the present invention can be achieved, for example, by means of a housing, which, when completely assembled, takes up a volume of at most 330 cm$^3$. For example, the maximum length of the housing (dimension in the transport direction) can be 96 mm, the maximum width of the housing (dimension in the transverse direction) can be 42.5 mm, and the maximum height of the housing (dimension in the vertical direction) can be 80 mm. This compact design naturally places increased demands on the arrangement of the individual components inside the housing.

In order to be able to monitor the operability of the actuator, in a modification of the present invention, the holding device also has a sensor unit for detecting the position of the actuating element of the actuator. In practice, it has turned out that regardless of the drive type of the actuator, as the length of operation time increases, the actuating element travels more slowly than when it is new. With the aid of the sensor unit according to the present invention for detecting the position of the actuating element, it is therefore possible on the one hand, to monitor how fast the actuating element actually executes the position change required for its function and on the other hand, to monitor whether it has even actually reached the desired end position. This makes it possible, for example, to implement a pre-malfunction display.

Preferably, it is also possible to integrate the actuating element sensor unit into the housing. However, this further complicates achieving the goal of the most compact possible design of the holding device. This is why the holding devices and separators known from the prior art have not been provided with actuating element sensor units of this kind up to this point.

In certain applications, it can be desirable for the housing also to include a connection point for the attachment of an additional sensor unit, which can be situated outside the housing and is for detecting the presence of a transport unit.

For example, the at least one transport unit sensor unit and/or the actuating element sensor unit can include an inductive sensor. Alternatively, however, it is also possible to use a limit switch and/or a proximity switch and/or a light barrier and/or a distance measuring system and/or a position detection system.

In a modification of the present invention, a display unit is also integrated into the housing. For example, this display unit can be a plain text display and/or a numeric display and/or an LED unit/display and for it to display information regarding the operating state of the holding device and/or the operating state of the components integrated into it and/or external components connected to it.

For example, it is possible to use a cylinder/piston unit for the actuator, which can be fluidically, preferably pneumatically, actuated. In this case, it is possible for the actuating element to be a piston rod attached to the piston or a part connected to this piston rod. Alternatively, however, it is also possible for the actuator to be an electromagnetically triggered actuator, e.g. one that is actuated by a solenoid, or to be an electromotively triggered actuator, e.g. one that is equipped with a spindle drive.

For example, it is possible for the actuator here to have a switch element for triggering the movement of the actuating element, in the case of the fluidically triggered actuator, this switch element can be a 3/2-way valve, for example, and in the case of the electromagnetically or electromotively triggered actuator, this switch element can be a switching relay.

Regardless of the specific drive concept of the actuator, in a modification of the present invention, the housing includes a connection point for supplying and/or draining a medium that provides the energy required to move the actuating element (auxiliary power). For example, the auxiliary power medium can be electrical current, compressed air, hydraulic fluid, or the like. With a view to achieving the most compact possible arrangement of all of the components in the holding device according to the present invention, it is preferable for this connection for the auxiliary energy medium to be situated adjacent to the switch element.

In order to be able to assure that the actuating element automatically moves into a predefined safety position even in the event of a failure of the supply of the auxiliary energy medium, the actuating element is prestressed into the extended position, for example by means of a spring. This spring can, for example, be a helical spring, preferably a helical compression spring.

In a modification of the present invention, the control unit has a signal and/or data exchange connection with both of the transport unit sensor units, with the actuator—in particular its switch element, and possibly also with the additional transport unit sensor unit and/or the actuating element sensor unit and/or the display unit. The signal and/or data lines provided for this purpose permit the control unit to receive the detection signals of the sensor units and to control the actuator.

According to the present invention, it is also possible for the housing to include a connection point for the external signal exchange connection to the superordinate control device.

Moreover, the control unit can be designed with or without its own intelligence. In the latter case, the control unit sends the detection signals to a remotely located, superordinate control device and receives a corresponding triggering signal for the actuator from this superordinate control device that it then simply forwards to the actuator. In the former case, however, the control unit is able to directly trigger the actuator as needed, as a function of the detection signals of the sensor units.

For example, the control unit can send the actuator the command to move the actuating element into its extended position when the sensor unit situated after the actuating unit has detected the presence of a transport unit. The issuing of this command is also communicated to the remotely located, superordinate control device so as to notify it of the current operating state of the holding device. If an additional transport unit sensor unit is also provided, then if the additional sensor unit has detected the presence of a transport unit, the control unit can send the actuator the command to move the actuating element into its retracted position. The issuing of this command is also communicated to the remotely located, superordinate control device so as to notify it of the current operating state of the holding device.

The advantage of the first case mentioned above is that it significantly reduces the quantity of signals and/or data to be transmitted via the external signal and/or data exchange connection. It also eliminates the time delay accompanying communications with the superordinate control device, i.e. the back-and-forth transport of data. The local intelligence can be provided, for example, in the form of $\mu C$ arithmetic/logic units or the like.

In order to be able to assure a compact arrangement of all the components of the holding device according to the present invention despite the complex functions that the control unit must perform, the control unit according to the present invention includes two control modules, one of which is situated in the transport direction before the actuator and the other of which is situated in the transport direction after the actuator. It is quite possible here for one of the control modules to be greater in volume than the other control module. The two control modules, which are preferably also connected to each other so that they can exchange signals and/or data, can be assigned with the individual functions in such a way as to minimize the overall length of the signal and/or data lines required.

For example, the actuating element sensor unit can be situated on the side of the actuator on which the larger-volume control module is situated. In addition, the switch element of the actuator can be situated on the side of the actuator on which the smaller-volume control module is situated. Furthermore, each of the two control modules can be respectively associated with one of the transport unit sensor units. Moreover, the larger-volume control module can be associated with the display unit and can be connected to all of the electrical connections of the housing.

In order to keep the design the two control modules as simple and yet compact possible, at least one of the two control modules is embodied in the form of a folding printed circuit board. The folding printed circuit board can be provided with at least one electrically conductive shielding surface, which, in the folded state of the folding printed circuit board, encompasses at least one electrical subcircuit of the control module, thus shielding it from external electromagnetic alternating fields.

It has also turned out to be advantageous to cast the folding printed circuit board in casting resin. This makes it possible to increase its resistance to leaks and consequently reduce its sensitivity to moisture, particularly at the connections of the signal and/or data lines to the other components of the holding device, for example the other control module. To improve the protection from external influences, it is also possible for the transport unit sensor unit and/or actuating element sensor unit associated with at least one of the control modules to be cast en bloc with its respective control module.

In order to also be able to protect the holding device according to the present invention—and in particular, its control modules—as effectively as possible from mechanical influences such as vibrations, shocks, and the like, at least one of the control modules can cooperate either with an associated securing bolt that serves to fasten the holding device to a superordinate assembly or with a part associated with this securing bolt so that a shoulder provided on the securing bolt or the part associated with it presses the control module into contact with a housing wall.

The signal and/or data exchange connections are preferably provided in the form of a signal and/or data line of the field bus type, preferably of the ASI bus type (Actuator Sensor Interface). This signal and/or data line can, for example, include a twin-wire cable that is simultaneously used to supply power and transmit signals. The reading of the data from this signal line requires so-called balancing coils, which react inductively to electromagnetic alternating fields emitted by the signal and/or data line.

Particularly with the use of inductive sensors in the transport unit sensor units and/or the actuating element sensor unit, since these sensor units can also generate electromagnetic alternating fields, there is a danger of interference with the function of the balancing coils in the holding device according to the present invention. Therefore in a modification of the present invention, if a control module, for example the larger-volume control module, is associated with two sensor units—for example one of the transport unit sensor units and the actuating element sensor unit, then the at least one balancing coil of this control module, which coil is required for the signal and/or data exchange, is situated approximately in the middle between the two sensor units. The alternating fields of these sensor units cancel each other out in this region so that no impermissible interference voltages can be induced in the balancing coil.

It should also be noted that it is preferable according to the present invention for at least some, preferably all of the electrical contacts, in particular the connections to the signal and/or data exchange connections, to be embodied in the form of plug contacts. This significantly facilitates assembly of the holding device according to the present invention since it eliminates the work required to produce soldered contacts.

An exemplary embodiment of the present invention will be explained in detail below in conjunction with the accompanying drawings.

DESCRIPTION OF THE PREFERRED EMBODIMENTS

Figure 1:
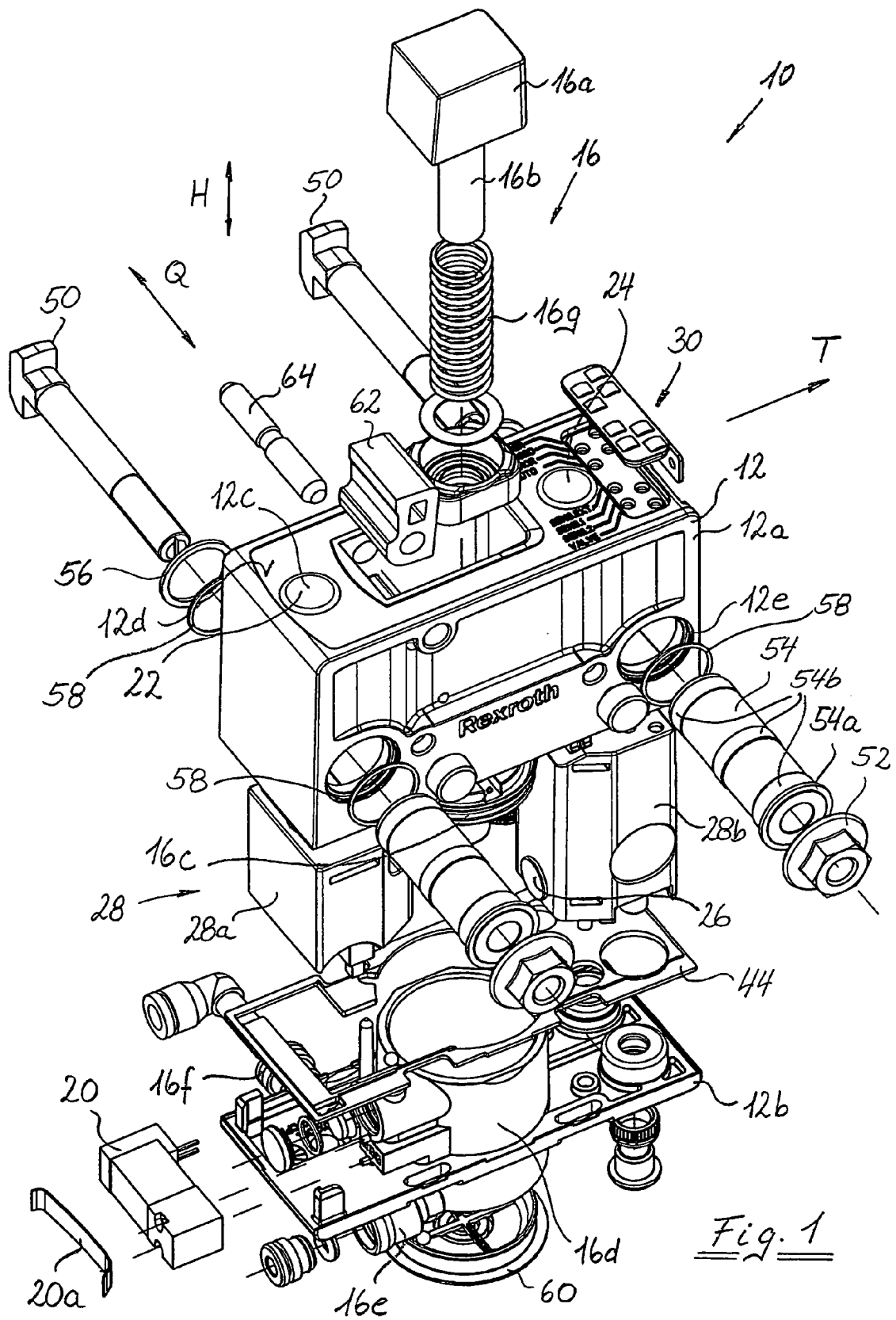
FIG. 1 is a perspective, exploded view of a holding device according to the present invention.
Figure 2:
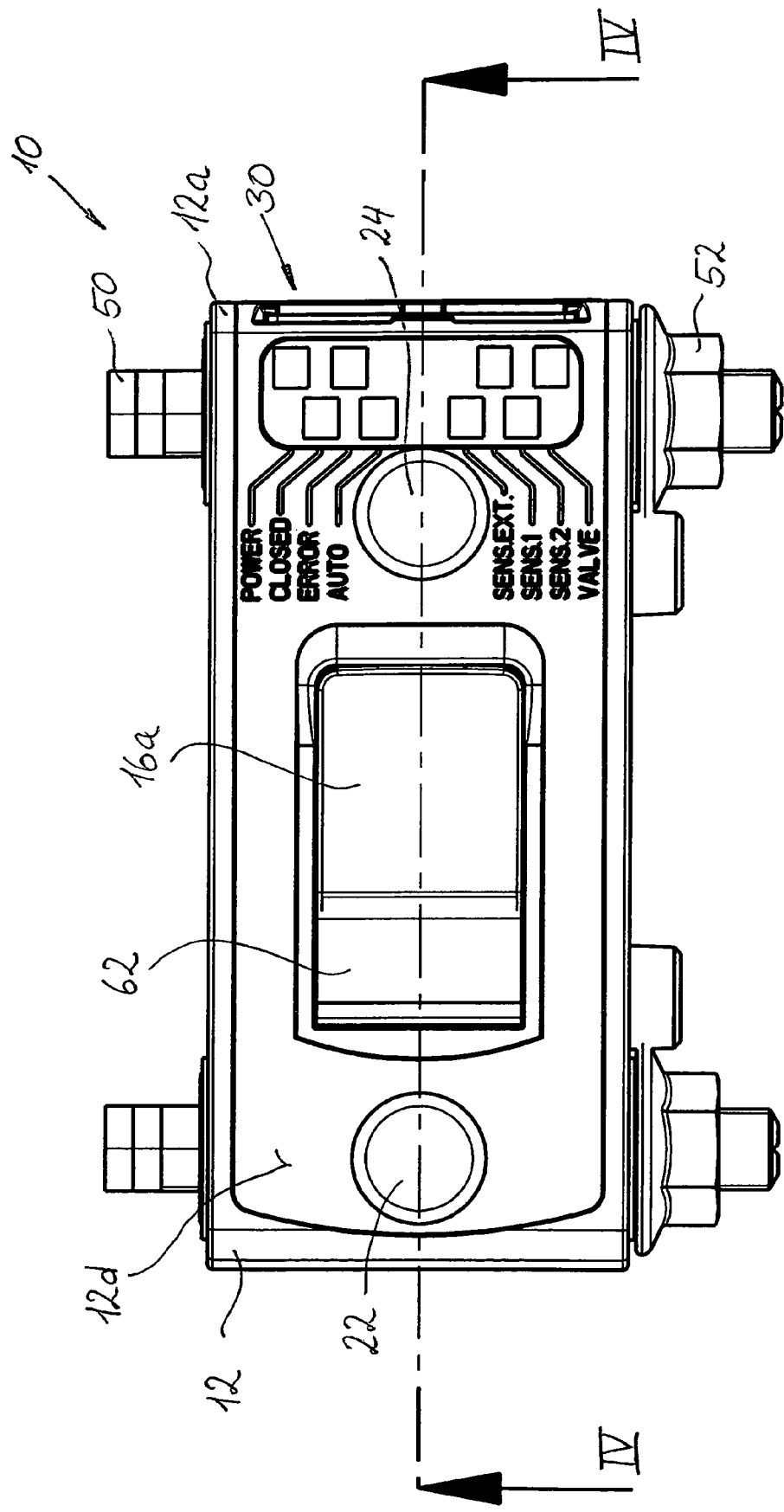
FIG. 2 is a top view of the holding device from FIG. 1.
Figure 3:
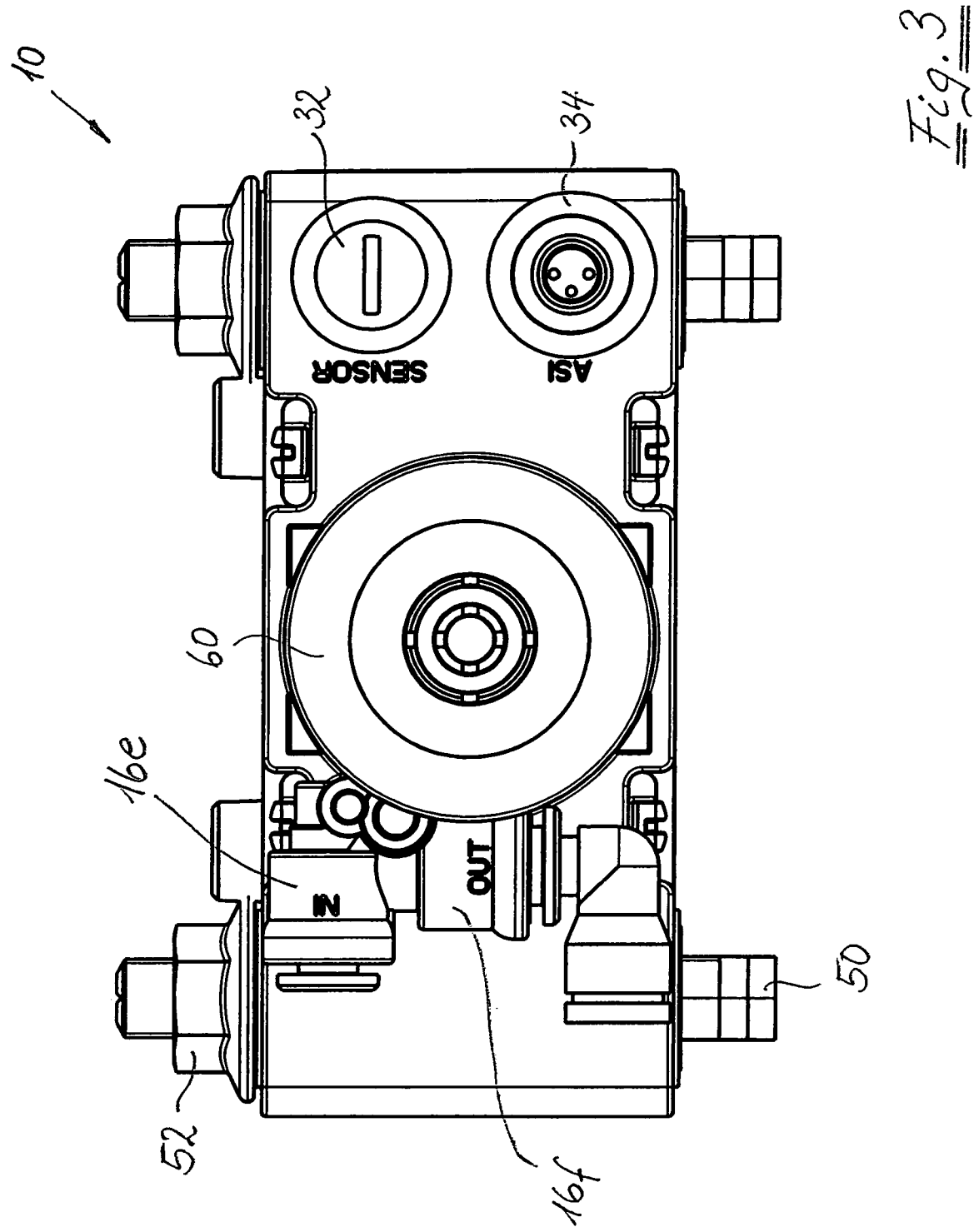
FIG. 3 is a bottom view of the holding device from FIG. 1.

In FIGS. 1 through 5, a holding device according to the present invention is labeled as a whole with a reference numeral 10. This holding device can be used, for example, in a production line or assembly line, as a separator for work pieces W (see FIG. 4), a work piece holder, or the like. Separators of this kind are intrinsically known from the prior art.

The holding device 10 according to the present invention has a housing 12, preferably comprised of plastic, which has an upper housing part 12a and a lower housing part 12b. In order to seal the housing 12 in relation to external influences, in particular to prevent moisture from penetrating into the housing 12, a flat seal 44 is positioned between the upper housing part 12a and the lower housing part 12b; when the two housing parts 12a and 12b are attached to each other, for example by means of a detent connection, this seal 44 is compressed between them, thus preventing moisture from penetrating into the inner chamber 14 of the housing 12.

Figure 4:
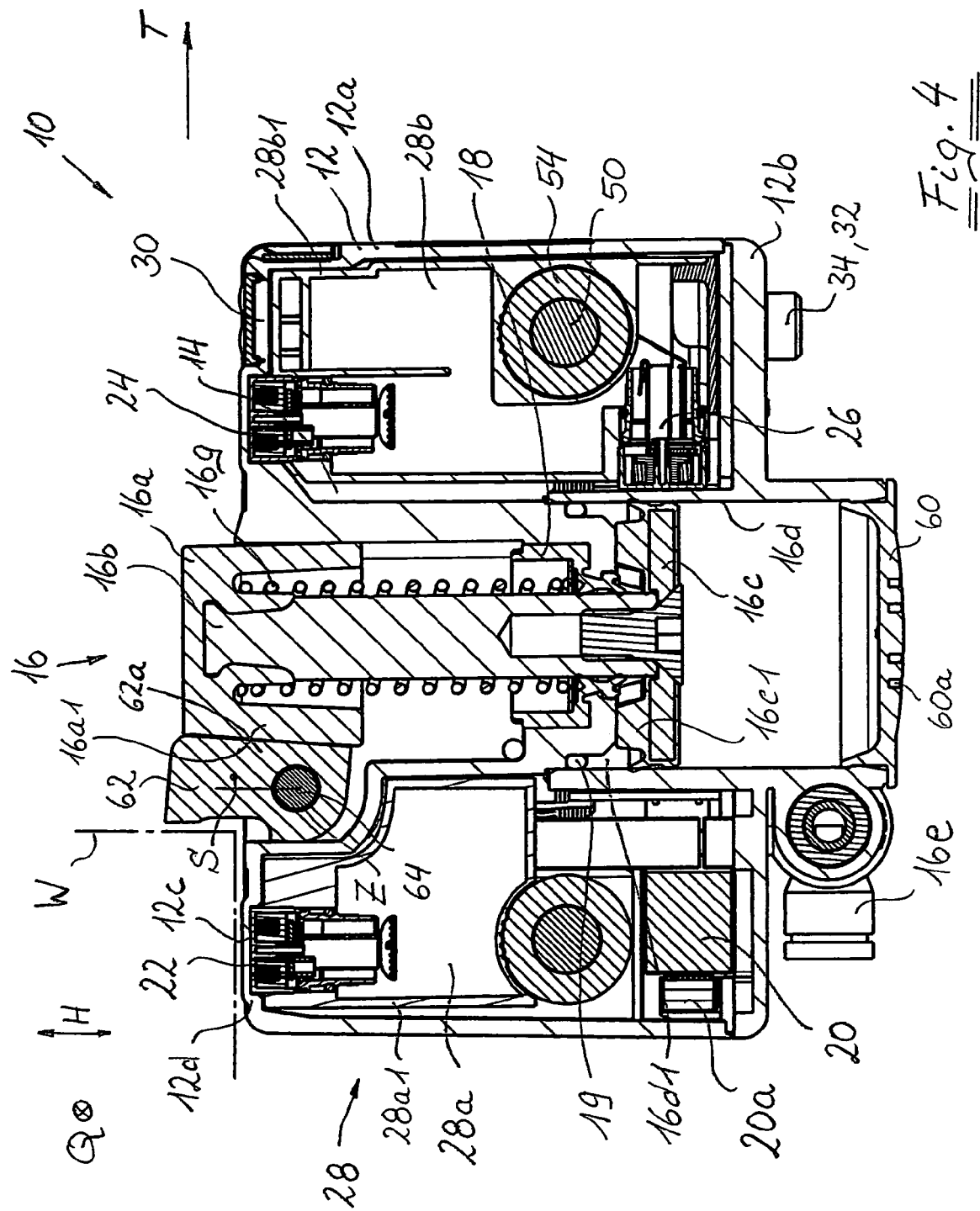
FIG. 4 is a sectional view of the holding device that cuts along the line IV-IV in FIG. 2.
Figure 5:
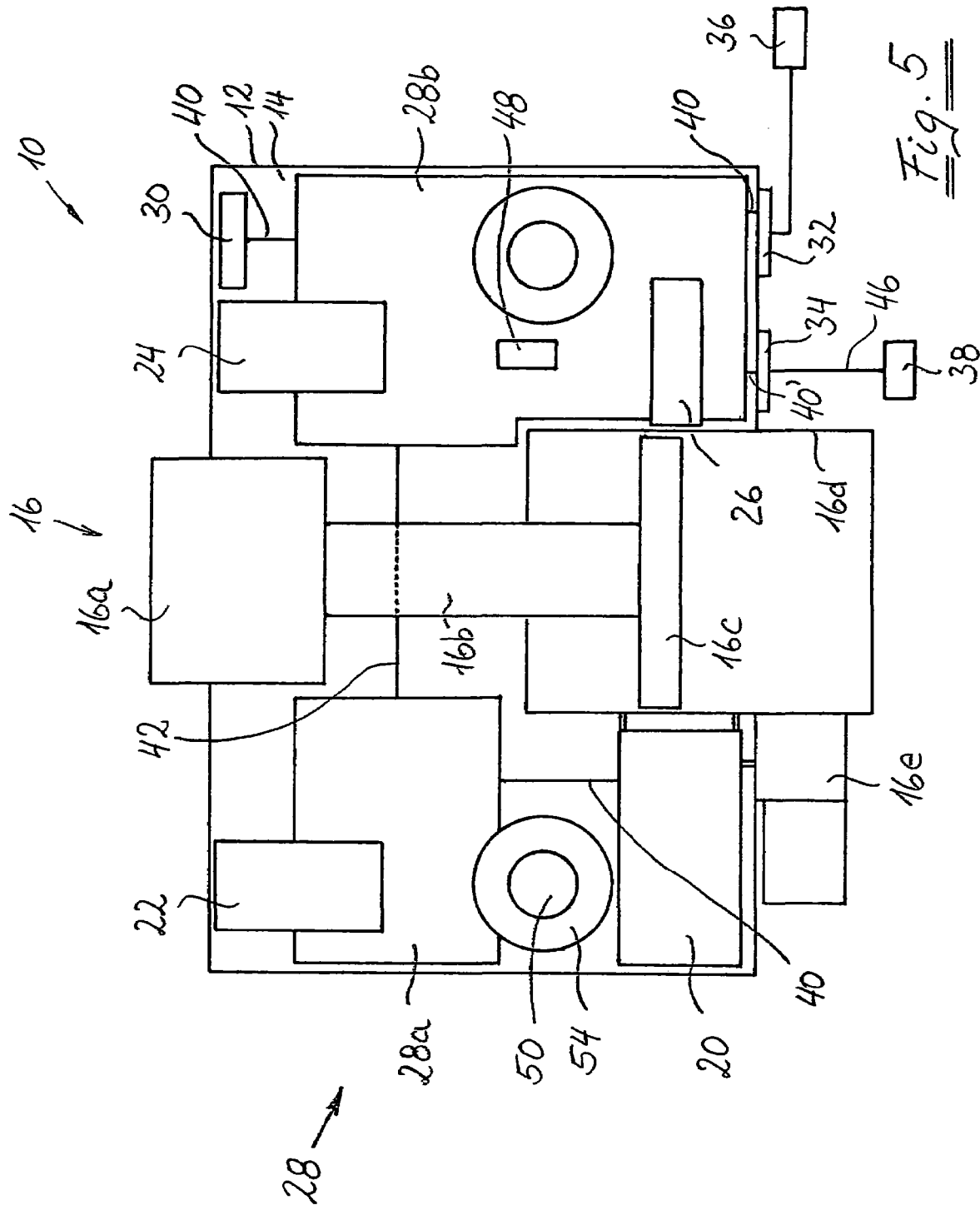
FIG. 5 is a schematic block diagram of the holding device according to the present invention, in a view similar to that shown in FIG. 4.

According to the present invention, all components of the holding device 10 that are essential for its function are accommodated in the enclosed interior 14 of the housing 12 (see FIGS. 4 and 5).

An actuator 16, which is embodied in the form of a pneumatically operating cylinder/piston unit in the exemplary embodiment depicted, includes an actuating element 16a that is connected to a piston rod 16b. The piston rod 16, as is particularly clear in FIG. 4, is in turn connected to a piston 16c. The piston 16c is able to move up and down in a sliding fashion in a cylinder 16d, which is of one piece with the lower housing part 12b. The lower housing part 12b is also provided with a connection fitting 16e for the supply of compressed air and a venting fitting 16f for venting the cylinder 16d. A helical compression spring 16g prestresses the actuating element 16a and therefore also the piston 16c into the extended positioned depicted in FIG. 4, i.e. the position in which it protrudes from the upper housing part 12a. One end of the spring 16g rests against the actuating element 16a and the other end rests against a sealing insert 18 (see FIG. 4), which produces a seal that prevents an undesired loss of pressure from the passage of the piston rod 16b through the upper housing part 12a into the pressure chamber 16d1 of the cylinder 16d. An O-ring seal 19 prevents a pressure loss from the inner chamber 14 of the housing 12. This also protects the inner chamber 14 of the housing 12 from the undesired intrusion of moisture.

The interior 14 also accommodates a 3/2-way valve 20 that is equipped with a valve spring 20a and functions as a switching unit, either for supplying compressed air to the actuator 16 or for ventilating the actuator 16 as desired.

In the transport direction T before the actuator 16, there is a sensor unit 22 for detecting the presence of a work piece W, a work piece holder, or the like in the region of the holding device 10. The sensor unit 22 is embodied, for example, in the form of an inductive sensor so that it can be accommodated entirely inside the housing 12. More precisely stated, the sensor unit 22 can be situated adjacent to a wall section 12c of the top surface 12d of the housing 12, which has a thinner wall thickness than the rest of the wall of the housing 12 and protects the sensor from external influences (see FIG. 4).

An analogous sensor unit 24 is also provided in the transport direction T after the actuator 16. The design and function of the sensor unit 24 correspond to those of the sensor unit 22.

Another sensor unit 26 is situated on the side of the actuator 16 opposite from the switch unit 20. This sensor unit serves to detect the position of the piston 16c in the cylinder 16d. In the present instance as well, the sensor unit 26 is embodied in the form of an inductive sensor. In order to achieve reliable detection results, the wall of the cylinder 16d adjacent to the sensor unit 26 is also embodied with a thin wall thickness. The sensor unit 26 can be used for monitoring the operability of the actuator 16 and in particular, the movement speed of the piston 16c and therefore of the actuating element 16a.

The detection results of the sensor units 22, 24, and 26 are transmitted to a control unit 28. The control unit 28 also supplies the switch unit 20 with actuation signals that are required for operating the actuator 16.

The control unit 28 has two control modules 28a and 28b: the control module 28a is situated before the actuator 16 in the transport direction T and the control module 28b is situated after the actuator 16 in the transport direction T. The division of the control unit 28 into two separate control modules 28a and 28b as well as the hereinafter described apportioning out of control functions to these two control modules 28a and 28b is also crucial to the achievement the compact design of the holding device 10 according to the present invention.

The control unit is also connected to a display unit 30, which, in the exemplary embodiment depicted in the drawings, is embodied in the form of an LED unit that displays information about the operating state of the holding device 10 and its various components.

Finally, the control unit 28 is also provided with two external connections, namely a connection 32 for attaching an external sensor unit 36 used to detect the presence of a work piece W or a work piece holder at a position remote from the holding device 10 and a connection 34 for attaching an external data line 46 used to transmit signals to a remote superordinate control device 38 and receive signals from this superordinate control device 38.

As is particularly clear in FIG. 5, the sensor units 22, 24, and 26, the switch unit 20, the display unit 30, and the connection point 32 are connected so that they can exchange data and/or signals with the control modules 28a and 28b via data and/or signal lines 40. The control modules 28a and 28b of the control unit are also connected so that they can exchange data and/or signals via a data and/or signal line 42. FIG. 5 does not show all of the lines 40 since, for example, the sensor units 22, 24, and 26 are each integrated into an associated control module 28a and 28b. The data and/or signal exchange connection to the external control device 38 will be discussed in greater detail below.

In the exemplary embodiment shown, the two control modules 28a and 28b do not take up the same amount of space. Instead, the control module 28b is greater in volume than the control model 28a since it also has to perform a greater number of control functions than the control module 28a. In fact, the control module 28a is only responsible for the sensor unit 22 and the switch unit 20, whereas the larger-volume control module 28b is associated with the sensor units 24 and 26, the display unit 30, and the two external connections 32 and 34.

The control modules 28a and 28b are preferably embodied in the form of circuits on folding printed circuit boards. These have the advantage that they can be easily manufactured while in the unfolded state and, once they have been fully equipped and wired, they can then be folded down to a small volume. In this folded-together state, the control modules can then be cast in casting resin and placed into prefabricated plastic housings 28a1 and 28b1. This once again significantly increases their protection from external influences, in particular moisture.

The control unit 28 of the holding device 10 according to the present invention is preferably connected to the external control device 38 by means of a field bus, for example a so-called ASI bus 46 (Actuator Sensor Interface). Correspondingly, the signal and/or data line 40', which attaches the connection point 34 to the control module 28b, is also embodied in the form of such a field bus, preferably an ASI bus.

Bus systems of the above-mentioned type have the advantage that they are simply designed and inexpensive to purchase. They are comprised essentially of a twin-wire cable that supplies the attached electronic components with the energy that is required for their operation, e.g. in the form of current, and with the signals and/or data that are designated for them.

The reading of the data from the twin-wire cable is performed with the aid of so-called balancing coils, which react inductively to electromagnetic alternating fields emitted by the current flowing through the twin-wire cable.

Since the holding device 10 according to the present invention also has three preferably inductively functioning sensor units 22, 24, and 26, which in turn emit electromagnetic alternating fields, usually in approximately the same frequency range of between 110 and 130 kHz, the problem arises that the sensor units 22, 24, and 26 can interfere with the functioning of the balancing coils 48 of the control unit 28. The present invention has at least mitigated this problem, if not avoided it altogether, in that the balancing coils 48 of the control module 28b, i.e. of the control unit 28, is situated essentially in the middle between the two sensor units 24 and 26 associated with the control module 28b. In this region, the electromagnetic alternating fields of the two sensor units 24 and 26 cancel each other out so that impermissible interference voltages can no longer be induced in the balancing coils 48. The sensor unit 22 associated with the control module 28a is already far enough from the balancing coils 48 that its interference potential, compared to that of the two sensor units 24 and 26, can essentially be disregarded.

Independent of the characteristics relating to protecting the housing 12 from the penetration of moisture and independent of the characteristics relating to compactly arranging all of the components in the housing 12, the above-explained placement of the balancing coils 48 when using a field bus system, preferably an ASI bus system, is of particular importance to the operability of the holding device 10 according to the present invention.

It should also be noted that the entire holding device 10 can be attached simply by means of two fastening bolts 50 to a superordinate assembly, for example the transport track of the transport system for transporting the work pieces W. To this end, the fastening bolts 50 are preferably embodied in the form of T-head bolts, which can be inserted into T-grooves of the superordinate component. The clamping forces acting between the fastening bolts 50 and the associated nuts 52 are preferably transmitted not by means of the plastic housing 12, but by means of metal sleeves 54, which are inserted into openings 12e of the upper housing part 12a of the housing 12 and pass through the housing 12. The relative positioning of the housing 12 in relation to the fastener 50/52/54 is executed by means of an annular collar 54a of the metal sleeve 54 and a plain washer 56, which is situated on the other side of the housing 12. In addition, sealing rings 58 are provided, which prevent the undesired penetration of moisture through the openings 12e.

It should also be noted that the metal sleeves 54 have a number of centering collars 54b via which they engage with the control modules 28a and 28b and the housing 12 in order to press the control modules 28a and 28b against the inside of the housing 12, toward the upper housing wall 12d, in fact. This ensures proper positioning of the sensor units 22, 24, and 26.

Finally, it should also be noted that the lower end of the cylinder 16d is closed by means of a cover 60 equipped with ventilation openings 60a. A seal for preventing the undesired penetration of moisture does not need to be produced here since in this instance, the inner chamber 14 of the housing 12 is already sealed by the sealing element 16c1 associated with the piston 16c of the actuator 16.

It should also be noted in conjunction with FIG. 4 that the actuating element 16a for holding the work pieces W does not itself act on them directly. Instead, in the transport direction T before the actuating element 16a, a holding element 62 is provided, which can be pivoted around an axle 64 extending in a transverse direction Q (which extends orthogonal to the transport direction T). As a result, the contact surface 16a1 of the actuating element 16a and the contact surface 62a of the holding element 62 enclose an angle of between approx. 5 and approx. 15°, preferably approximately 10° with the vertical direction H (which extends orthogonal to both the transport direction T and the transverse direction Q). Moreover, in the extended state of the actuating element 16a or the holding state of the holding element 62 depicted in FIG. 4, the center Z of the pivot axle 64 is not flush with the center of gravity S of the holding element 62 in the vertical direction H, but is instead situated after it in the transport direction T. As a result, when the actuating element 16a is moved into its retracted position, the holding element 62 automatically pivots clockwise in FIG. 4, thus leaving room for the work piece W.

It will be understood that each of the elements described above, or two or more together, may also find a useful application in other types of constructions differing from the types described above.

While the invention has been illustrated and described as embodied in holding device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device (10) for holding a transport unit (W), which moves along a transport path in a transport direction (T), the device following an actuator (16) equipped with a drive unit (16c/16d) and an actuating element (16a) switchable by drive unit (16c/16d) to switch between an extended position and a retracted position so that when the actuating element (16a) is in the extended position, it is possible to bring the device directly or indirectly into a holding engagement with the transport unit (W), but in the retracted position, the actuating element (16a) allows the transport unit (W) to travel past; a sensor unit (22) situated before the actuator (16) in a transport direction (T) and detecting a presence of the transport unit (W) before the actuator (16); a sensor unit (24) situated after the actuator (16) in the transport direction (T) and detecting a presence of the transport unit (W) after the actuator (16); and a control unit (28) for receiving detection results of the transport unit sensor units (22, 24) and controlling the actuator (16), wherein the two transport unit sensor units (22, 24), the control unit (28), and at least the drive unit (16c/16d) of the actuator (16) are integrated into a shared housing (12).

2. The holding device as defined in claim 1, wherein the housing (12) is comprised of two housing parts (12a, 12b).

3. The holding device as defined in claim 2, wherein a sealing element (44) is provided between the two housing parts (12a, 12b).

4. The holding device as defined in claim 3, wherein the sealing element is a flat seal.

5. The holding device as defined in claim 2, wherein the two housing parts (12a, 12b) are connectable with one another in a manner selected from the group consisting of detent connectable and snappable together.

6. The holding device as defined in claim 5, wherein the two housing parts (12a, 12b) are made of plastic.

7. The holding device as defined in claim 1, wherein the housing (12) has at least one guide element for one of components of the holding device (10).

8. The holding device as defined in claim 1, wherein when completely assembled, at least some components of the holding device (10) are connected in a manner selected from the group consisting of detent connected and press-fitted to one another.

9. The holding device as defined in claim 8, wherein when completely assembled all components of the holding device (10) are connected in a manner selected from the group consisting of detent connected and press fitted to one another.

10. The holding device as defined in one of claim 1, wherein the housing (12) is formed so that, when completely assembled, takes up a volume of at most 330 cm3.

11. The holding device as defined in one of claim 1, further comprising a sensor unit (26) for detecting the position of the actuating element (16a) of the actuator (16).

12. The holding device as defined in claim 11, wherein the actuating element sensor unit (26) is also integrated into the housing (12).

13. The holding device as defined in claims 1, wherein the housing (12) also has a connection point (32) for attaching an additional sensor unit (36) that is situated outside the housing (12) and is for detecting the presence of a transport unit (W).

14. The holding device as defined in claim 1, wherein at least one of the transport unit and sensor unit (22, 24) has an inductive sensor.

15. The holding device as defined in claim 1, further comprising a display unit (30) which is also integrated into the housing (12).

16. The holding device as defined in claim 1, wherein the actuator (16) is a cylinder piston unit (16c, 16d) actuatable in a manner selected from the group consisting of magnetically actuated, electromotively actuated and fluidicially actuated.

17. The holding device as defined in claim 16, wherein the cylinder piston unit (16ac, 16d) is pneumatically actuatable.

18. The holding device as defined in claim 16, wherein the actuator (16) has a switch element (20) for triggering a movement of the actuating element (16a).

19. The holding device as defined in claim 1, wherein the switch element (20) is a 3/2 way valve.

20. The holding device as defined in claim 1, wherein the housing (12) has a connection point (16e/16f) for a medium selected from the group consisting of a supplying point, a draining point and both, which provides energy required to move the actuating element (16a).

21. The holding device as defined in claim 20, wherein the connection point (16e/16f) for supplying and/or draining the medium that provides energy required to move the actuating element (16a) is situated on one side of the actuator (16) with reference to the transport direction (T), whereas a connection point (32) for attachment of an additional sensor unit (36) which is situated outside the housing (12), and a connection point (34) for an external signal exchange connection with a superordinate control device (38) are situated on the respective other side of the actuator (16).

22. The holding device as defined in claim 1, wherein the actuating element (16a) is prestressed into the extended position.

23. The holding device as defined in claim 22; further comprising a spring (16b) which prestresses the actuating element (16a).

24. The holding device as defined in claim 23, wherein the control unit (28) has a signal exchange connection to the transport unit, sensor units (22, 24) and a switch element (20) of the actuator (16).

25. The holding device as defined in claim 24, wherein the actuator (16) has a switch (20) situated on a side of the actuator (16) on which a smaller-volume control module (28a) is situated.

26. The holding device as defined in one of claim 1, wherein the control unit (28) has a signal exchange connection to both of the transport unit sensor units (22, 24) and the actuator (16).

27. The holding device as defined in claim 26, wherein the control unit (28) also has a signal exchange connection also to an element selected from the group consisting of an additional transport unit sensor unit (36), an additional actuating element sensor unit (269), an additional display unit, and combinations thereof.

28. The holding device as defined in claim 27, wherein at least the signal exchange connection has a signal line (46) of the field bus type, preferably of the ASI bus type.

29. The holding device as defined in claim 28, wherein the field bus type is an ASI bus type.

30. The holding device as defined in claim 29, wherein if a control module (28*b*) is associated with two sensor units (24, 26), then at least one balancing coil (48), which belongs to this control module (28*b*) and is required for the signal exchange, is situated substantially in a middle between the two sensor units (24, 26).

31. The holding device as defined in claim 28, wherein at least one element belongs to the holding device (10) and connected to the field bus (46) is equipped with local intelligence.

32. The holding device as defined in claim 28, wherein said at least one element is at least one (29*b*) of the control modules.

33. The holding device as defined in claim 1, wherein the control unit (28) has two control modules (28*a*, 28*b*), one of which (28*a*) is situated in the transport direction (T) before the actuator (16) and the other of which (28*b*) is situated in the transport direction (T) after the actuator (16).

34. The holding device as defined in claim 33, wherein one of the control modules (28*b*) is greater in volume than the other respective control module (28*a*).

35. The holding device as defined in claim 34, wherein the actuating element sensor unit (26) is situated on a side of the actuator (16) on which the larger-volume control module (28*b*) is situated.

36. The holding device as defined in claim 33, wherein at least one of the two control modules (28*a*, 28*b*), is embodied in the form of a folding printed circuit board.

37. The holding device as defined in claim 33, wherein both control modules (28*a*, 28*b*) are embodied in a form of a folded printed circuit board.

38. The holding device as defined in claim 36, wherein the folding printed circuit board is provided with at least one electrically conductive shielding surface.

39. The holding device as defined in claim 37, wherein a folded state of the folding printed circuit board, at least one shielding surface encompasses at least one electrical subcircuit of the control module (28*a*, 28*b*).

40. The holding device as defined in claim 37, wherein the folding printed circuit board is cast in casting resin.

41. The holding device as defined in claim 38, wherein a unit selected from the group consisting of the transport unit sensor unit (22, 24), an actuating element sensor unit (26) associated with at least one of the control modules (28*a*, 28*b*), and both, is cast en bloc with the respective control module (28*a*, 28*b*).

42. The holding device as defined in claim 33, wherein at least one of the control modules (28*a*, 28*b*) cooperates in a manner selected from the group consisting of cooperation with an associated securing bolt (50), which serves to fasten the holding device (10) to a superordinate assembly, and cooperation with a part (54) associated with this securing bolt (50) so that a shoulder (54*b*) provided on this securing bolt (50) or on a part (54) associated with the shoulder (54*b*) presses the at least one control module (28*a*, 28*b*) into contact with a wall of the housing (12).

* * * * *